(12) United States Patent
Arpaci et al.

(10) Patent No.: US 11,002,323 B2
(45) Date of Patent: May 11, 2021

(54) DRUM BRAKE AND BRAKE SHOE

(71) Applicant: SAF-HOLLAND GmbH, Bessenbach (DE)

(72) Inventors: Muhammet Arpaci, Aschaffenburg (DE); Rainer Stegmann, Hösbach (DE); Elmar Weber, Dülmen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 15/756,819

(22) PCT Filed: Aug. 19, 2016

(86) PCT No.: PCT/EP2016/069729
§ 371 (c)(1),
(2) Date: Mar. 1, 2018

(87) PCT Pub. No.: WO2017/036825
PCT Pub. Date: Mar. 9, 2017

(65) Prior Publication Data
US 2018/0252277 A1 Sep. 6, 2018

(30) Foreign Application Priority Data
Sep. 1, 2015 (DE) ...................... 10 2015 114 551.0

(51) Int. Cl.
*F16D 51/10* (2006.01)
*F16D 65/08* (2006.01)
(Continued)

(52) U.S. Cl.
CPC ............. *F16D 51/10* (2013.01); *F16D 51/20* (2013.01); *F16D 65/08* (2013.01); *F16D 65/09* (2013.01); *F16D 65/10* (2013.01); *F16D 65/22* (2013.01); *F16D 69/0416* (2013.01); *F16D 2051/008* (2013.01); *F16D 2065/026* (2013.01); *F16D 2065/134* (2013.01);
(Continued)

(58) Field of Classification Search
CPC .......... F16D 51/10; F16D 65/08; F16D 65/09; F16D 65/22; F16D 65/10; F16D 2065/134
See application file for complete search history.

(56) References Cited

U.S. PATENT DOCUMENTS 2,020,578 A   11/1935   Sawtelle
2,095,719 A   10/1937   Sinclair
(Continued)

FOREIGN PATENT DOCUMENTS

CN   87103935    12/1987
CN   203161903    5/2013
(Continued)

OTHER PUBLICATIONS

European Patent Office; International Search Report; dated Oct. 19, 2016.

*Primary Examiner* — Xuan Lan Nguyen
(74) *Attorney, Agent, or Firm* — Price Heneveld LLP

(57) ABSTRACT

A drum brake includes a brake drum with an attaching region for arranging the brake drum on a vehicle part, such as a wheel hub, and a shell region with a first contact face, and a friction lining with a second contact face which faces toward the shell region, the first and second contact face being curved along or in a radial plane.

18 Claims, 2 Drawing Sheets

(51) Int. Cl.

| | | |
|---|---|---|
| *F16D 65/10* | (2006.01) | |
| *F16D 69/04* | (2006.01) | |
| *F16D 51/20* | (2006.01) | |
| *F16D 65/09* | (2006.01) | |
| *F16D 65/22* | (2006.01) | |
| *F16D 65/02* | (2006.01) | |
| *F16D 51/00* | (2006.01) | |

(52) U.S. Cl.
CPC ........... *F16D 2065/1308* (2013.01); *F16D 2065/1324* (2013.01); *F16D 2069/0441* (2013.01)

(56) References Cited

U.S. PATENT DOCUMENTS

| | | | |
|---|---|---|---|
| 2,113,608 A | 4/1938 | Waller | |
| 2,126,945 A | 8/1938 | Bragg | |
| 2,201,445 A | 5/1940 | Miller et al. | |
| 2,582,755 A * | 1/1952 | Kenny | F16D 49/16 188/250 D |
| 3,467,229 A | 9/1969 | Deibel | |
| 3,814,218 A * | 6/1974 | Merz | B60T 7/206 188/112 R |
| 3,891,069 A * | 6/1975 | Lawrence | F16D 65/08 188/250 G |
| 6,245,180 B1 * | 6/2001 | Barnhardt | B29C 35/0222 156/212 |
| 2007/0034457 A1 * | 2/2007 | Kim | F16D 49/00 188/29 |

FOREIGN PATENT DOCUMENTS

| | | | |
|---|---|---|---|
| CN | 103867611 | 6/2014 | |
| CN | 204055747 | 12/2014 | |
| EP | 1752673 | 2/2007 | |
| GB | 1015483 A * | 12/1965 | ......... F16D 69/0416 |

* cited by examiner

DRUM BRAKE AND BRAKE SHOE

BACKGROUND OF THE INVENTION

The present invention relates to a drum brake and to a brake shoe of a drum brake, both in particular for commercial vehicles, such as trucks, semitrailers, trailers or the like.

Drum brakes of the type under discussion here are well known from the prior art. Here, a brake drum is provided, in the interior of which two brake shoes are mounted pivotably, and the brake shoes are pressed via a cam roller and a camshaft onto the inner circumferential face of the brake drum. It is a problem in drum brakes of this type, however, that, upon actuation of the drum brake, the open region of the brake drum which does not have the attaching region for mounting on the wheel hub expands on account of thermal influence, with the result that the brake linings no longer pass into full surface contact with the brake drum.

It is therefore an object of the present invention to provide a drum brake and a brake shoe of a drum brake, in particular for commercial vehicles, which ensure high operational reliability in all operating states, in particular by way of full surface bearing of the brake linings against the brake drum.

SUMMARY OF THE INVENTION

According to the invention, a drum brake, in particular for commercial vehicles, is provided, comprising a brake drum with an attaching region for arranging the brake drum on a vehicle part, such as a wheel hub, and a shell region with a first contact face, and a friction lining with a second contact face which faces the shell region, the first and second contact face being curved along or in a radial plane. The brake drum is therefore constituted, in particular, by two regions, namely the attaching region and the shell region. The attaching region serves to fasten or arrange or mount the brake drum on a vehicle part which can be configured as a wheel hub or a vehicle axle. For this purpose, the attaching region extends from the shell region with a radial component toward the rotational axis, and has corresponding connecting or fastening regions for mounting on the vehicle part. A shell region preferably extends on the outer circumference of the attaching region in the axial direction, that is to say in a direction parallel to the rotational axis of the drum brake. As a consequence, the shell region is expediently configured in the form of a cylinder with a circularly annular cross section. A first contact face is configured on the inner circumference of the shell region, which first contact face therefore likewise extends substantially circumferentially about the rotational axis. Furthermore, a friction lining is provided, on the outer circumference of which a second contact face is provided which faces the shell region, in particular its first contact face, in the assembled state of the drum brake. Here, the friction lining is arranged or can be arranged on the first contact face. In other words, the friction lining can therefore be in contact with or can be brought into contact with the first contact face. It is also possible that the friction lining, in particular its second contact face, can be brought into engagement with the shell region, in particular its first contact face. It is particularly advantageous that the first and second contact face are curved along or in a radial plane. The radial plane is defined by the rotational axis and a radius which lies perpendicularly with respect to the former. The radial plane therefore intersects the brake drum and the friction lining, with the result that, as viewed in said radial plane, the first and second contact face are in each case curved. The curvature is expediently circular or arcuate or curve-shaped, but not polygonal. As a result, it is particularly advantageously possible that the first and second contact face are in full surface contact or can be brought into full surface contact, independently of the axial position of the brake drum and the friction lining with respect to one another.

The brake drum and the friction lining are expediently configured as separate elements or parts or in multiple pieces.

The friction lining and the shell region can advantageously be moved axially with respect to one another. In other words, the friction lining and the shell region can be moved with respect to one another in such a way that the movement takes place at least with a component in the axial direction or in the direction of the rotational axis. The movement takes place, in particular, by a sliding movement of the first and second contact face with respect to one another being provided. Here, the movement with a component at least in the axial direction takes place in such a way that the movement or displacement follows the curvature of the first and second contact face. In other words, it is therefore possible to provide the position of the brake drum with respect to the friction lining in at least two different states or positions on account of the movability between the friction lining and the shell region. This is particularly advantageous in the case of an actuation of the drum brake, since the free region of the brake drum is enlarged in terms of its diameter (mushrooms or becomes conical), and therefore a relative movement between the friction lining and the shell region is the consequence.

Preferably, one of the contact faces is of concave configuration and the other of the contact faces is of convex configuration. In other words, therefore either the first or the second contact face is of concave configuration along or in the radial plane. In an analogous manner to this, the other of the contact faces is of correspondingly convex configuration.

It is particularly advantageous if the curvatures of the first and second contact faces are of congruent configuration with respect to one another. Therefore, in particular, the first contact face and the second contact face can have substantially the same curvature radius. "Substantially the same curvature radius" means that the ratio of the curvature radius of the first contact face to the curvature radius of the second contact face lies between 0.95 and 1.05, in particular between 0.98 and 1.02. This ensures that the first and second contact face can be brought into full surface contact with one another.

The curvature radii of the first and second contact faces along the radial plane are advantageously greater than along the pivoting plane. The pivoting plane lies perpendicularly with respect to the rotational axis of the drum brake and therefore parallel to a radius of the rotational axis. As a consequence, the first and second contact face therefore form the configuration of the shell face of a barrel in one special embodiment.

The ratio of the curvature radii of the first and/or second contact faces along the pivoting plane to the curvature radii of the first and/or second contact faces along the radial plane preferably lies between 0.01 and 0.08, preferably between 0.02 and 0.06. An optimum movability between the friction lining and the brake drum with an optimum transmission of force during the braking operation is made possible, in particular, by way of a ratio of between 0.02 and 0.06.

The curvature radii of the first and second contact faces are expediently constant along the radial plane and/or the pivoting plane. In other words, the intersection line or curve of the first and second contact faces with a radial plane, on which the rotational axis lies, and/or the pivoting plane which lies perpendicularly with respect to the rotational axis therefore has a constant curvature radius, with the result that said intersection line is substantially circularly arcuate. A particularly uniform angular offset compensation of the friction lining is ensured, in particular, by way of a constant curvature radius along or in the radial plane.

In one preferred embodiment, the friction lining is in engagement with the brake drum in such a way that a movement of the friction lining with respect to the shell region in the circumferential direction is prevented. The circumferential direction therefore extends circumferentially about the rotational axis. In other words, a rotation of the friction lining is prevented on account of the engagement with the brake drum about the rotational axis of the drum brake. Here, the engagement between the friction lining and the brake drum takes place, in particular, in a frictionally locking manner.

Preferably, a first engagement region is provided on the first contact face of the shell region and a second engagement region is provided on the second contact face of the friction lining, preferably one of the engagement regions being configured as a recess and the other of the engagement regions being configured as a projection. It goes without saying that a multiplicity of first and second engagement regions which are distributed over the circumference can advantageously be provided. It is particularly advantageous if the engagement regions are distributed uniformly over the circumference of the first and second contact face. The direction of extent of the engagement regions is preferably such that they extend, in particular, radially and/or axially, that is to say parallel to the rotational axis. It is particularly advantageous if the engagement regions are configured as a projection and a recess which are expediently of congruent design with respect to one another. In addition or as an alternative, it is possible to provide a separate engagement means or a multiplicity of separate engagement means which act between the first and the second engagement region. The engagement between the brake drum and the friction lining therefore serves, as it were, for anti-rotation securing between the brake drum and the brake lining about the rotational axis.

The friction lining is expediently configured as a circumferentially closed ring. In other words, the friction lining therefore forms an annular body which extends circumferentially about the rotational axis.

As an alternative, the friction lining can be configured as a ring segment. The ring segment therefore advantageously extends circumferentially about the rotational axis of the drum brake. The drum brake particularly advantageously has a pair of ring segments which are arranged so as to lie substantially opposite one another in relation to the rotational axis. In a further advantageous embodiment, a multiplicity of ring segments are provided which are expediently arranged on the inner circumference of the shell region.

An application device is preferably provided which is designed to press or push or force the friction lining which is configured as a ring segment, preferably a multiplicity of ring segments, against the first contact face of the shell region. The application device can be configured by way of one or a multiplicity of application elements. For this purpose, an application device is preferably arranged at each axial end of the friction lining, that is to say at that end of the friction lining which faces the attaching region and that end of the friction lining which faces away from the attaching region. Here, the application device or the application elements extends/extend circumferentially and are/is expediently configured as rings or application rings.

A face of the friction lining which lies opposite the second contact face is preferably configured as a friction face. The friction face is preferably of curved configuration about the rotational axis of the drum brake along or in the pivoting plane. As viewed in the radial plane, however, the friction face is advantageously of straight, that is to say non-curved, configuration, that is to say extends in the axial direction in a non-curved manner.

In a further preferred embodiment, the drum brake has a brake shoe which can be moved with respect to the brake drum, the friction lining being fixed or being capable of being fixed on an arrangement face of a lining carrier of the brake shoe via a connecting face. The brake shoe can be moved with respect to the brake drum, in particular, in such a way that the latter can be brought into and out of engagement with the brake drum in order to actuate the drum brake. For this purpose, the brake shoe is mounted pivotably on a brake carrier. The arrangement face of the brake shoe is advantageously of curved configuration along or in the pivoting plane about the rotational axis of the drum brake. In the radial plane, the arrangement face is expediently of straight, that is to say non-curved, configuration, that is to say extends in the axial direction in a non-curved manner. In other words, the arrangement face forms the shell face of a cylinder. The friction lining is fixed or can be fixed on the arrangement face of the lining carrier in such a way that a relative movement between the friction lining and the lining carrier cannot take place.

Expediently, the first contact face is configured as a friction face of the shell region and the second contact face is configured as a friction face of the friction lining. The friction faces therefore serve to dissipate the forces which occur on account of the rotation of the brake drum with respect to the brake shoe into frictional and thermal energy. In other words, the first contact face and the second contact face therefore form a frictional pairing.

The brake shoe is expediently mounted such that it can be pivoted with respect to the rotational axis. For this purpose, a brake carrier is provided which forms a mount for the brake shoe. The brake shoe can be pivoted or tilted with respect to the brake carrier, with the result that its angle can be changed, as viewed in the pivoting plane, in order to actuate the drum brake. The brake shoe can particularly advantageously also be pivoted or tilted in the radial plane, with the result that the angle with respect to the rotational axis can be changed.

Furthermore, a brake shoe of a drum brake, in particular for commercial vehicles, is provided according to the invention, comprising a lining carrier with an arrangement face which is curved along or in a pivoting plane about a rotational axis of the drum brake, and a friction lining which is arranged or can be arranged on the arrangement face, the friction lining having a friction face which lies opposite the arrangement face and is curved along or in a radial plane. The friction face of the friction lining can have, in particular, all of the features and functions of the second contact face which are described above in relation to the drum brake according to the invention. The brake shoe is configured in such a way that it has means for movement with respect to the brake drum, with the result that it can be brought into and out of engagement with the brake drum in order to actuate the drum brake. For this purpose, the brake shoe has a mounting region, via which it can be mounted pivotably on a brake carrier. The arrangement face of the brake shoe is advantageously of curved configuration along or in the pivoting plane about the rotational axis of the drum brake. In the radial plane, the arrangement face is expediently of straight, that is to say non-curved, configuration, that is to say extends in the axial direction in a non-curved manner. In other words, the arrangement face forms the shell face of a cylinder. The friction lining is fixed or can be fixed on the arrangement face of the lining carrier in such a way that a relative movement between the friction lining and the lining carrier cannot take place. It is particularly advantageous that the friction face is curved along or in a radial plane. The radial plane is defined by the rotational axis and a radius which lies perpendicularly with respect to the former. The radial plane therefore intersects the brake drum and the friction lining, with the result that, as viewed in said radial plane, the friction face is curved. The curvature is expediently circular or arcuate or curve-shaped, but not polygonal. As a result, it is particularly advantageously possible that the friction face can be in full surface contact or can be brought into full surface contact with a contact face of the brake drum, independently of the axial position of the brake drum and the friction lining with respect to one another.

The friction face is expediently of convex configuration.

The curvature radius of the friction face along the radial plane is preferably greater than along the pivoting plane. The pivoting plane lies perpendicularly with respect to the rotational axis of the drum brake and therefore parallel to a radius of the rotational axis. As a consequence, the friction face therefore forms the configuration of the shell face of a barrel in one special embodiment.

The ratio of the curvature radius of the friction face along the pivoting plane to the curvature radius of the friction face along the radial plane advantageously lies between 0.01 and 0.08, preferably between 0.02 and 0.06. An optimum movability between the friction lining and the brake drum with an optimum transmission of force during the braking operation is made possible, in particular, by way of a ratio between 0.02 and 0.06.

The curvature radius of the friction face is expediently constant along the radial plane and/or along the pivoting plane. In other words, the intersection line or curve of the friction face with a radial plane, on which the rotational axis lies, and/or the pivoting plane which lies perpendicularly with respect to the rotational axis therefore has a constant curvature radius, with the result that said intersection line is substantially circularly arcuate. A particularly uniform angular offset compensation of the friction lining is ensured, in particular, by way of a constant curvature radius along or in the radial plane.

It goes without saying that the further advantages and features of the drum brake according to the invention, in particular as described in conjunction with the brake shoe, can be used in the brake shoe according to the invention.

BRIEF DESCRIPTION OF THE DRAWINGS

Further advantages and features of the present invention result from the following description of preferred embodiments in relation to the appended figures, in which.

DETAILED DESCRIPTION OF THE PREFERRED EMBODIMENTS

Figure 1A:
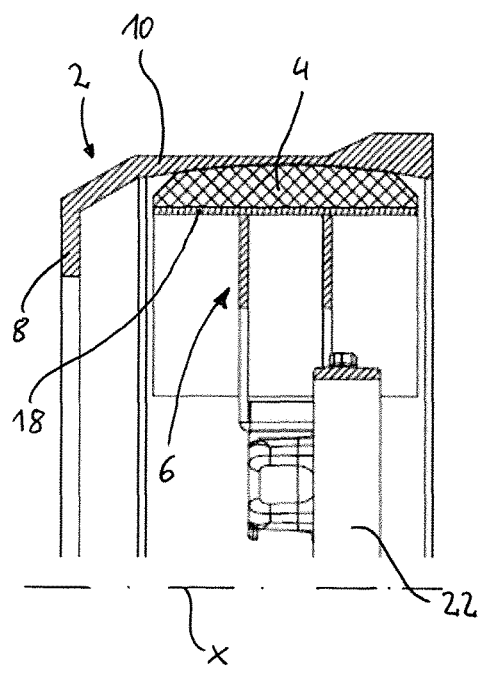
FIGS. 1(a) and 1(b) show two cross-sectional views of one preferred embodiment of the drum brake according to the invention, in two states.
Figure 1B:
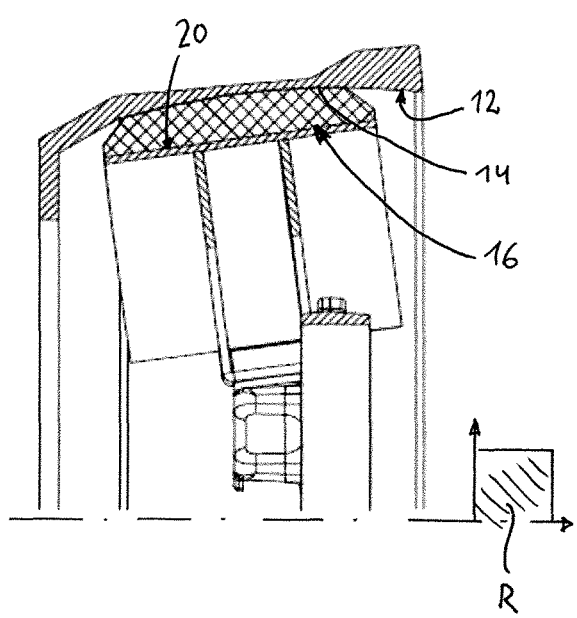

FIGS. 1(a) and 1(b) show two cross-sectional views in the radial plane of the first, preferred embodiment of the drum brake according to the invention. Here, FIG. 1(a) shows the drum brake in the cold state, and FIG. 1(b) shows the drum brake in the case of thermal expansion, that is to say in the actuated state. The drum brake comprises a brake drum 2, a friction lining 4 and a brake shoe 6.

The brake drum has an attaching region 8 for arranging the brake drum 2 on a vehicle part, such as an axle element or a wheel hub. Here, the attaching region expediently extends in the radial direction, but at least with a component in the radial direction. In a manner which adjoins the attaching region 8, the brake drum 2 has a shell region 10 which configures substantially the shape of a hollow cylinder. On its inner circumference, the shell region 10 has a first contact face 12.

The friction lining 4 has a second contact face 14 which faces the shell region 10, in particular the first contact face 12. In a manner which lies opposite the second contact face 14, the friction lining 4 has a connecting face 16, via which the friction lining 4 is arranged or fixed on the brake shoe 6.

For this purpose, the brake shoe 6 has a lining carrier 18 with an outwardly directed arrangement face 20. The brake shoe 6 is mounted on a brake carrier 22 such that it can be pivoted or rotated with respect to the rotational axis x.

In order to make a movement possible in the axial direction, that is to say parallel to the rotational axis x, between the friction lining 4 and the shell region 10, the first contact face 12 and second contact face 14 are of curved configuration along or in a radial plane R. For this purpose, the first contact face 12 expediently has a first curvature radius $r_1$ and the second contact face 14 has a second curvature radius $r_2$. The first curvature radius $r_1$ and the second curvature radius $r_2$ are advantageously greater along or in the radial plane R than along or in the pivoting plane S. In other words, the first contact face 12 and the second contact face 14 therefore expediently form the surface shape of a shell face of a barrel.

Figure 2A:
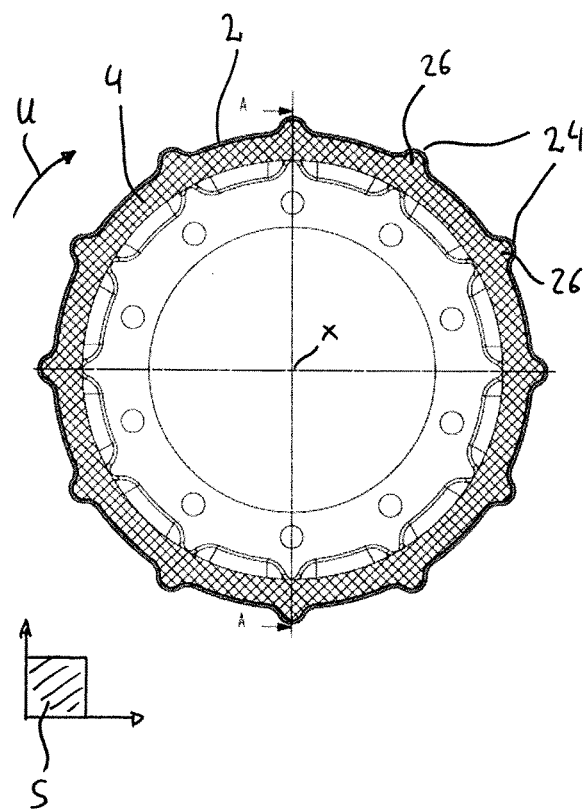
FIGS. 2(a) and 2(b) show cross-sectional views of a further preferred embodiment of the drum brake according to the invention.
Figure 2B:
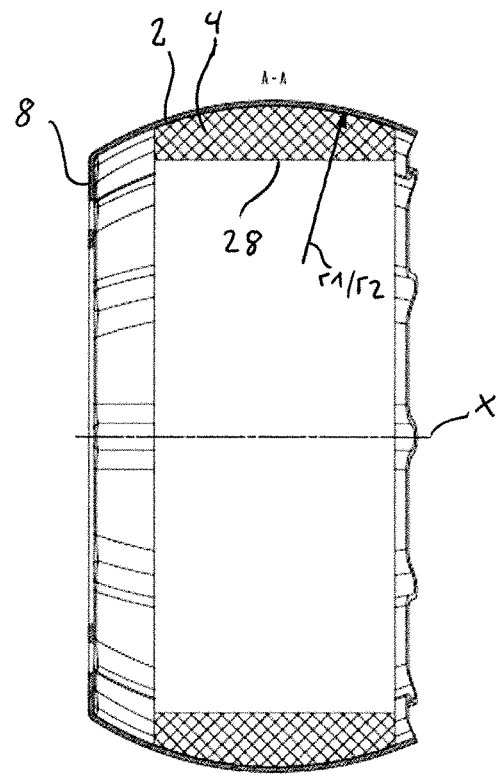

FIGS. 2(a) and 2(b) show a second, preferred embodiment of the drum brake according to the invention, FIG. 2(a) showing a cross section in the pivoting plane S and FIG. 2(b) showing a cross section in the radial plane R. In the embodiment which is shown, a brake drum 2 is likewise provided, on which a friction lining 4 is arranged. The latter is not fixed on a brake shoe, however, but rather is in engagement with the brake drum 2 in such a way that a movement of the friction lining 4 with respect to the shell region 10 in the circumferential direction U is prevented. For this purpose, a first engagement region 24 is provided on the first contact face 12 and a second engagement region 26 is provided on the second contact face 14 of the friction lining 4. In the embodiment which is shown, the second engagement region 26 is configured as a radially projecting, axially extending projection which engages into a first engagement region 24 which is configured (preferably congruently) as a recess. In an alternative refinement, the two engagement regions 24, 26 can also be configured as recesses, between which a separate engagement means acts.

Unlike in the embodiments which are shown in FIG. 1, in which the contact face 12 and the second contact face 14 are configured as friction faces and therefore as a frictional pairing, a friction face 28 which lies opposite the second contact face 14 is provided in the embodiment which is shown in FIG. 2.

Figure 3A:
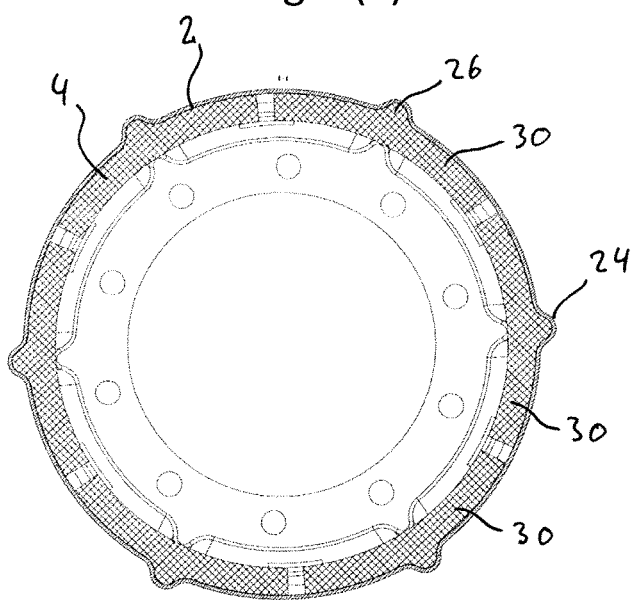
FIGS. 3(a) and 3(b) show cross-sectional views of a further preferred embodiment of the drum brake according to the invention.
Figure 3B:
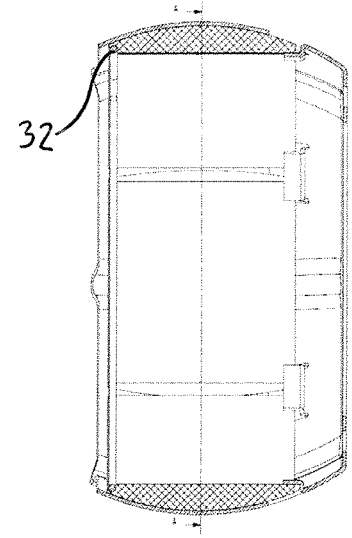

FIGS. 3(*a*) and 3(*b*) show a further preferred embodiment of the drum brake according to the invention. FIG. 3(*a*) shows the drum brake in a cross-sectional view in the pivoting plane S, and FIG. 3( ) shows the drum brake in a cross-sectional view in the radial plane R. In contrast to the embodiment which is shown in FIG. 2, the friction lining 4 is not configured as a circumferentially closed ring, but rather is constituted by way of a multiplicity of ring segments 30. In order to press or force the ring segments 30 against the first contact face 12 of the shell region 10, an application device 32 is provided. The application device 32 can be configured, for example, as a ring which extends in the circumferential direction U and, as viewed in the axial direction, is arranged on a circumferential edge region of the friction lining or the ring segments 30.

LIST OF DESIGNATIONS

2 Brake drums
4 Friction lining
6 Brake shoe
8 Attaching region
10 Shell region
12 First contact face
14 Second contact face
16 Connecting face
18 Lining carrier
20 Arrangement face
22 Brake carrier
24 First engagement region
26 Second engagement region
28 Friction face
30 Ring segment
32 Application device
R Radial plane
U Circumferential direction
S Pivoting plane
X Rotational axis
$r_1, r_2$ Curvature radii

The invention claimed is:

1. A drum brake for commercial vehicles, comprising:
a brake drum with an attaching region configured to arrange the brake drum on a wheel hub, and a shell region with a first contact face; and
a friction lining with a second contact face which faces toward the shell region;
the first and second contact face being curved along or in a radial plane;
wherein the friction lining and the shell region are configured to move axially with respect to one another such that the movement takes place at least with a component in the axial direction, and wherein a curvature radii of the first and second contact faces along the radial plane are greater than along a pivoting plane;
wherein one of the contact faces has a concave configuration and the other of the contact faces has a convex configuration; and
wherein a ratio of the curvature radii of the first and/or second contact faces along the pivoting plane to the curvature radii thereof along the radial plane is between 0.01 and 0.08.

2. The drum brake as claimed in claim 1, wherein the ratio is between 0.02 and 0.06.

3. The drum brake as claimed in claim 2, wherein the friction lining engages the brake drum in such that a movement of the friction lining with respect to the shell region in the circumferential direction is prevented.

4. The drum brake as claimed in claim 3, wherein the first contact face of the shell region includes a first engagement region, and the second contact face of the friction lining includes a second engagement region, and wherein one of the engagement regions comprises a recess and the other of the engagement regions comprises a projection.

5. The drum brake as claimed in claim 4, wherein the friction lining comprises a ring segment.

6. The drum brake as claimed in claim 5, further comprising:
an application device configured to press the friction lining configured as a ring segment against the first contact face of the shell region.

7. The drum brake as claimed in claim 6, wherein the ring segment is one of a multiplicity of ring segments.

8. The drum brake as claimed in claim 6, wherein a face of the friction lining which lies opposite the second contact face comprises a friction face.

9. The drum brake as claimed in claim 3, further comprising:
a brake shoe configured to be moved with respect to the brake drum, the friction lining being fixed or being capable of being fixed on an arrangement face of a lining carrier of the brake shoe via a connecting face.

10. The drum brake as claimed in claim 9, wherein the first contact face comprises a friction face of the shell region and the second contact face comprises a friction face of the friction lining.

11. The drum brake as claimed in claim 1, wherein the friction lining engages the brake drum in such that a movement of the friction lining with respect to the shell region in the circumferential direction is prevented.

12. The drum brake as claimed in claim 11, wherein the first contact face of the shell region includes a first engagement region, and the second contact face of the friction lining includes a second engagement region, and wherein one of the engagement regions comprises a recess and the other of the engagement regions comprises a projection.

13. The drum brake as claimed in claim 1, wherein the friction lining comprises a ring segment.

14. The drum brake as claimed in claim 1, further comprising:
an application device configured to press the friction lining configured as a ring segment against the first contact face of the shell region.

15. The drum brake as claimed in claim 14, wherein the ring segment is one of a multiplicity of ring segments.

16. The drum brake as claimed in claim 1, wherein a face of the friction lining which lies opposite the second contact face comprises a friction face.

17. The drum brake as claimed in claim 1, further comprising:
a brake shoe configured to be moved with respect to the brake drum, the friction lining being fixed or being capable of being fixed on an arrangement face of a lining carrier of the brake shoe via a connecting face.

18. The drum brake as claimed in claim 17, wherein the first contact face comprises a friction face of the shell region and the second contact face comprises a friction face of the friction lining.

* * * * *